Nov. 21, 1961  J. C. KREJCI  3,009,784
PROCESS FOR PRODUCTION OF CARBON BLACK
Filed June 30, 1958  5 Sheets-Sheet 2
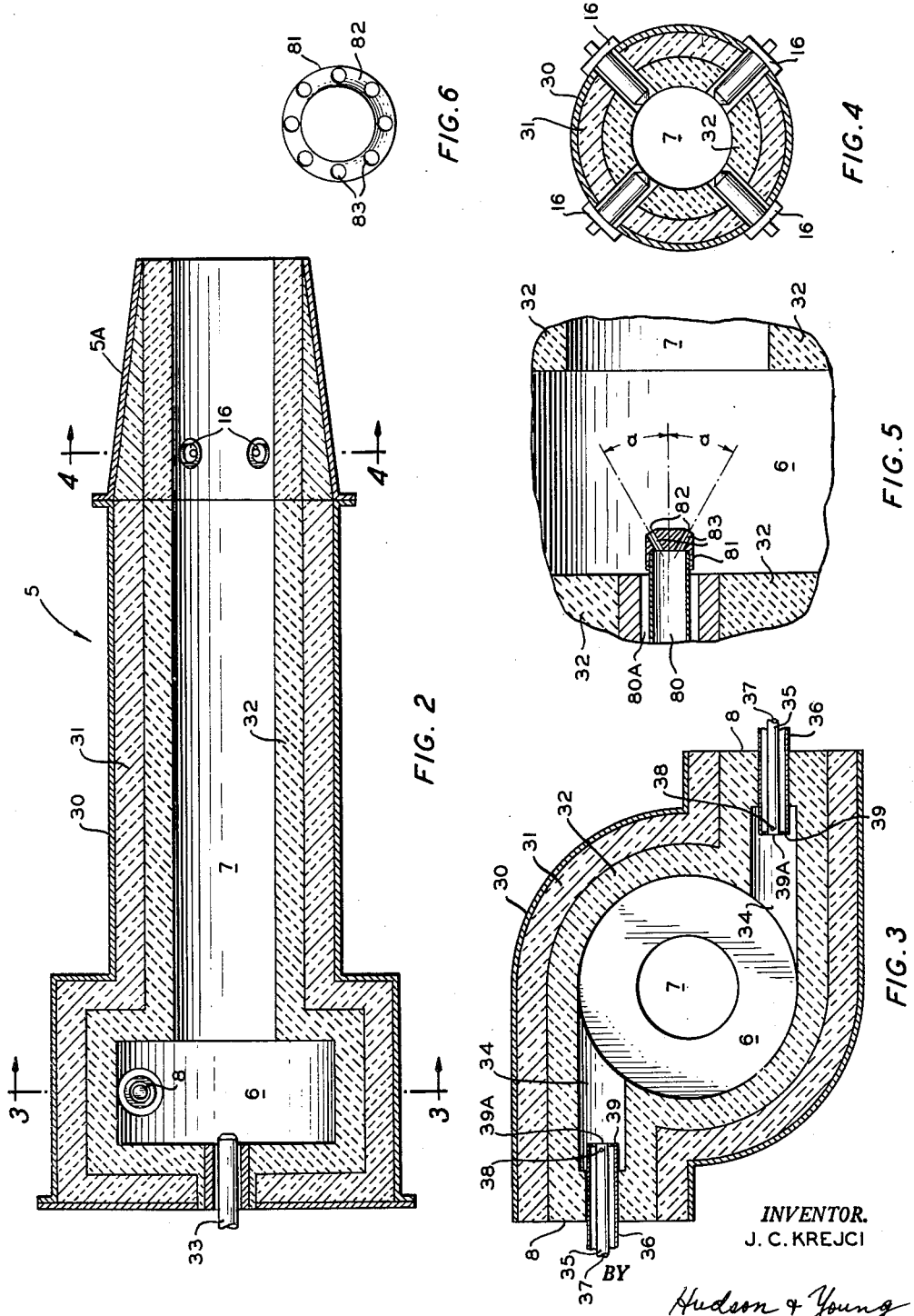
INVENTOR.
J. C. KREJCI
BY Hudson & Young
ATTORNEYS Nov. 21, 1961 J. C. KREJCI 3,009,784
PROCESS FOR PRODUCTION OF CARBON BLACK
Filed June 30, 1958 5 Sheets-Sheet 3
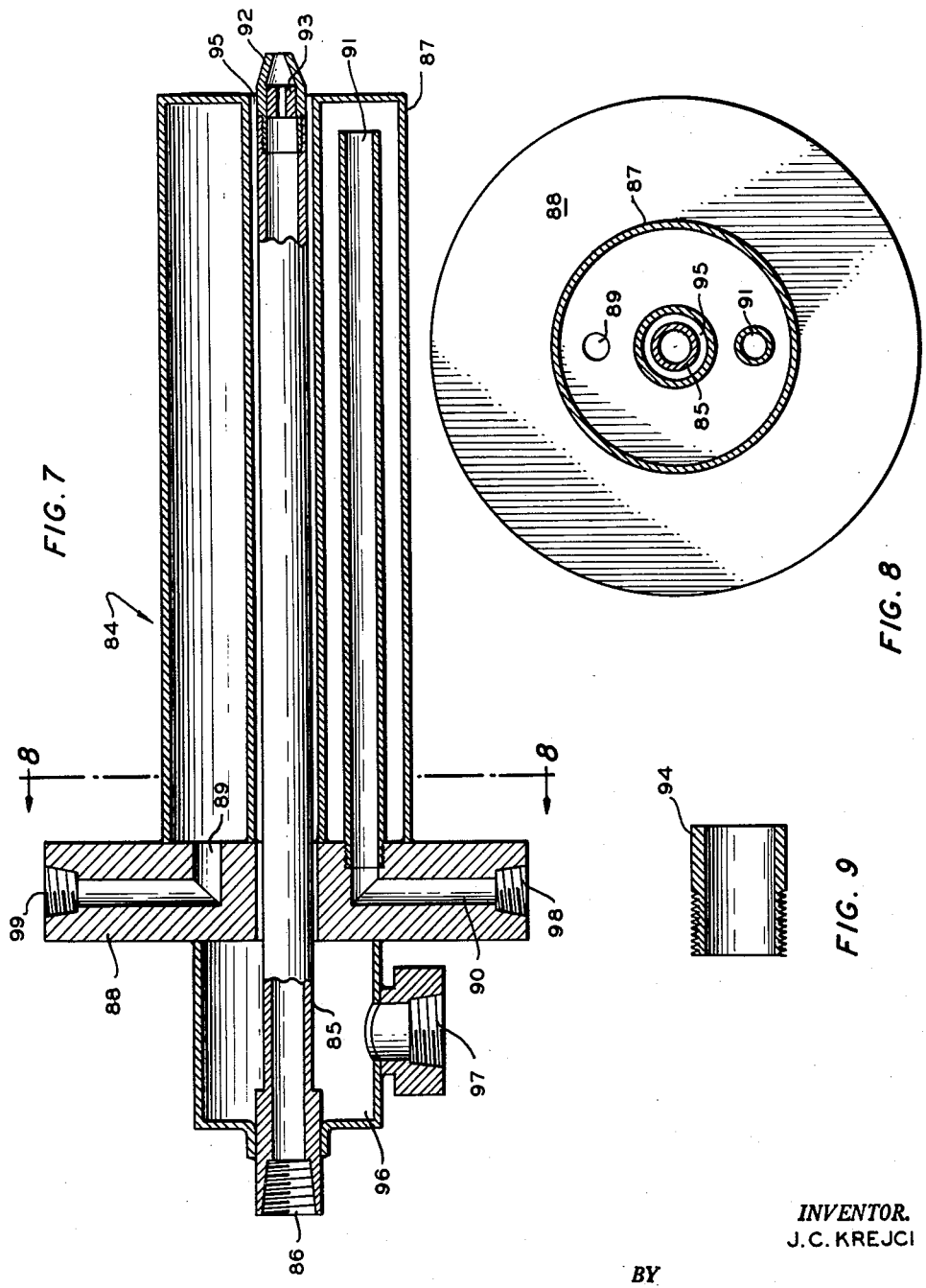
*INVENTOR.*
J.C. KREJCI
BY *Hudson & Young*
ATTORNEYS Nov. 21, 1961  J. C. KREJCI  3,009,784
PROCESS FOR PRODUCTION OF CARBON BLACK
Filed June 30, 1958  5 Sheets-Sheet 4

INVENTOR.
J.C. KREJCI
BY
Hudson & Young
ATTORNEYS

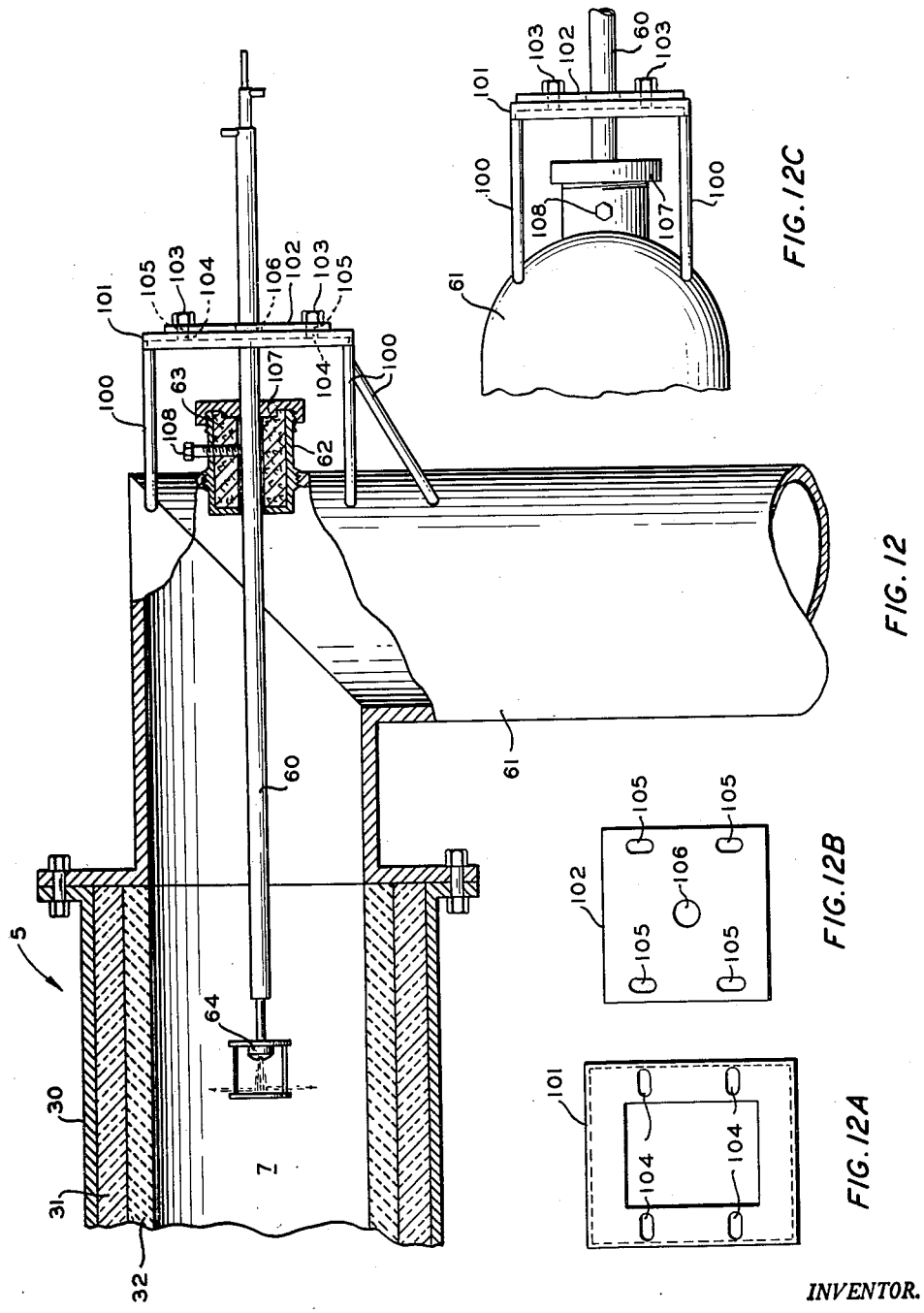

United States Patent Office 3,009,784
Patented Nov. 21, 1961

3,009,784
PROCESS FOR PRODUCTION OF
CARBON BLACK
Joseph C. Krejci, Phillips, Tex., assignor to Phillips
Petroleum Company, a corporation of Delaware
Filed June 30, 1958, Ser. No. 745,771
2 Claims. (Cl. 23—209.4)

This invention relates to the production of carbon black by partial combustion and/or pyrolysis of a carbonaceous material. In one aspect, it relates to a process wherein reaction conditions can readily be varied to improve the properties of a product carbon black. In another aspect it relates to an apparatus for conducting such a process. This application is a continuation-in-part of my copending prior application Serial No. 594,983, filed June 29, 1956, and abandoned August 7, 1958, by not responding to the last Official Action therein, which copending prior application was in turn a continuation-in-part of my copending prior application Serial No. 406,695, filed January 28, 1954, abandoned December 22, 1956, by not responding to the last Official Action therein.

It is known in the prior art to produce carbon black by directing a hot oxidizing or combustion gas in a generally helical path adjacent the periphery of a generally cylindrical reaction zone and directing a reactant material axially into said zone inside the helically-moving mass of hot gas. The reactant is thereby rapidly heated to a carbon black-forming temperature, e.g., in the range 2200 to 3500° F., and reacted in said zone to form carbon black, which is subsequently recovered. Processes of this type are known as tangential flame processes and are illustrated in U.S. Patents 2,375,795; 2,375,796; 2,375,797; and 2,375,798 (1945). Another tangential flame type process is disclosed in U.S. Patent 2,564,700 (1951) which involves the injection of a combutible mixture of fuel and oxidizing gas circumferentially into a combustion zone and the reaction of the mixture by combustion near the periphery of said zone. The resulting combustion gas, at a high temperature, travels in a generally spiral path toward the axis of a combustion zone and is then directed in a generally helical path adjacent the periphery of a reaction zone which is contiguous with, of smaller diameter than, and in open communication with, said combustion zone. A carbonaceous reactant is directed along the common axis of said zones and is rapidly heated to a carbon black-forming temperature by virtue of heat directly imparted from the helically-moving combustion gas. The reactant is reacted within the reaction zone to form carbon black, which is subsequently recovered. This type of tangential-flame process is known as a precombustion process, since the hot gas is substantially completely formed by combustion prior to contact with the reactant.

The reaction mixture formed in a process of the type above described comprises a suspension of a carbon black in combustion gas. It is known in the prior art to withdraw such a mixture from the reaction zone and to cool the mixture suddenly by the direct injection thereinto of a cooling liquid, such as water, in order to cool the mixture suddenly to a temperature at which no further reaction can occur. In the prior art, however, such cooling, which is commonly known as quenching, has been applied to the reaction mixture outside of the reaction zone proper.

I have found that the point, along the line of flow of the reaction mixture, at which quenching is effected has a substantial effect upon the properties of the carbon black produced. I have further found that when the initial quenching is effected within the reaction zone proper, and not at a point downstream thereof in transfer equipment, the properties of the carbon black are substantially varied, depending upon the point within the reaction zone at which the initial quenching is effected. I have further unexpectedly found that a carbon black classed as "SAF black" (super abrasion-resistant furnace carbon black) characterized by having a "nitrogen surface area" of more than 130 square meters per gram by the standard carbon black nitrogen surface area test known to and recognized as standard by the art, and by imparting to standard rubber test mixtures greater resistance to abrasion than carbon blacks of less than 130 square meters per gram nitrogen surface area, may be produced in the process and apparatus of the present invention, as clearly shown by the numerical data in the examples in Table V, for a 12 inch diameter reaction zone furnace, by increasing the rate of tangentially introduced air to more than 270,000 standard cubic feet per hour, the rate of tangentially introduced gas to more than 18,000 standard cubic feet per hour, and the axial oil rate to at least 270 gallons per hour, and extending the axial hydrocarbon feed injector tube from 2 to 6 inches into the inlet end of the combustion zone of the furnace.

According to the present invention, a carbon black-containing reaction mixture produced in a tangential-flame process is quenched within the reaction zone itself. The position in the reaction zone at which the quenching occurs can be varied within rather broad limits. Generally, in accordance with this invention, the quenching is effected in the downstream three-fourths part of the reaction zone. However, when a long reaction zone is used, quenching upstream of the one-fourth point can be utilized, if desired, provided that the quenching occurs at a point downstream from that at which the initial substantial formation of carbon black takes place. It is further desirable to quench immediately after the carbon black which has formed has become free of tarry material, that is when it has become a tar-free black as defined in commerce, which is when samples of the flocculent carbon black separated from the off gas and collected at point 25 in the drawing have a photelometer of at least 80 and preferably 85 or greater at this point, before pelleting. This photelometer test is well known in the art, and the standard procedure is set forth in the next paragraph.

The tar content of carbon black is determined by mixing 2 grams of black with 50 cc. of chloroform, boiling the mixture, filtering, and determining the percentage light transmittance of the filtrate as compared with the transmittance of a blank sample of chloroform. The comparison is preferably conducted with a photoelectric colorimeter such as a Lumetron colorimeter at a wave length of 440 mu, a light intensity of 20, and a cell 1 cm. long. A tar-free black is arbitrarily defined as one that shows in tests on samples taken after pelleting a transmittance greater than 85 percent according to this procedure. Pelleting the flocculent black (not disclosed) by the conventional processes raises the photelometer number 5 points, or more, from 80 to 85 for example. Acetone is sometimes substituted for chloroform in the test procedure. The percent transmittance equivalent to 85% with chloroform is about 92% with acetone. The original acetone or chloroform used for the test should be substantially colorless.

When the term "photelometer" is used without naming the solvent, the convention in the art is that chloroform is the solvent employed.

According to one embodiment of the invention, the quenching of a carbon black-containing reaction mixture produced in a tangential-flame process of the precombustion type is effected by injecting a plurality of streams or jets of quench liquid from the periphery of the reaction zone toward the interior thereof.

According to another embodiment of the invention, the quenching is effected by injecting the quench liquid, in a plurality of streams or jets, from a point, in the reaction zone, at or near the axis thereof, toward the periphery of the reaction zone.

One object of the present invention is to provide an improved process for producing carbon black and another object is to provide an improved apparatus for carrying out said process.

Another object is to provide a process and apparatus for producing an improved carbon black characterized by a large nitrogen surface area, preferably above 130 meters$^2$/grams, and/or capable of imparting high abrasion resistance to rubber compounds to which said carbon black is added.

This invention also contemplates apparatus suitable for effecting the quenching as above described. Thus, in one embodiment of the invention, there is provided a precombustion-type reactor provided with a plurality of radially-positioned quench inlets at a downstream locus in the reaction chamber. Another embodiment of the invention comprises an apparatus wherein a longitudinally-positioned quench is provided at a downstream position in the reaction chamber. Said quench inlet can be longitudinally movable within the reaction chamber, so that the point of introduction of quench liquid can be changed as desired.

The quenching liquid is ordinarily water. However, other liquid materials, such as liquefied, normally gaseous hydrocarbons, can be used.

The details of the manner in which the variation of the point of introduction of the primary quench liquid within the reaction zone results in a variation of the properties of the product carbon black is incompletely understood. It is possible that the rapid cooling effected by the quench causes one or more reactions, physical or chemical, to cease before normal completion.

The term "quenching" or "quench," as used in this application and the claims, means the introduction into a reaction mixture of a material, in the liquid phase, at a temperature and in sufficient quantity, so that the temperature of the reaction mixture is suddenly reduced, by virtue of sudden vaporization of the liquid.

The drawings illustrate several embodiments of this invention.

FIGURE 2 is an elevational sectional view of a reactor according to this invention.

FIGURE 3 is a cross-sectional view of the reactor taken along line 3—3 of FIGURE 2.

FIGURE 4 is a cross-sectional view of the reactor taken along line 4—4 of FIGURE 2.

FIGURE 5 is an interior view of a reactor of the type shown in FIGURE 2 and equipped with a nozzle suitable for injection of vaporized reactant.

FIGURE 6 is an end view of said nozzle.

FIGURE 7 is a sectional elevation of another reactant injection nozzle according to this invention.

FIGURE 8 is a cross-sectional view taken along line 8—8 of FIGURE 7.

FIGURE 9 is a cross-sectional view of a tip which can replace tip 92 in FIGURE 7 when the reactant is supplied in the gas or vapor phase, to the reactor.

FIGURE 12 is an elevational view of a reactor having another type of quencher according to this invention.

FIGURE 12A is an end view of member 101 of FIGURE 12.

FIGURE 12B is an end view of plate 102 of FIGURE 12.

FIGURE 12C is a plan view of framework shown in FIGURE 12.

Figure 1:
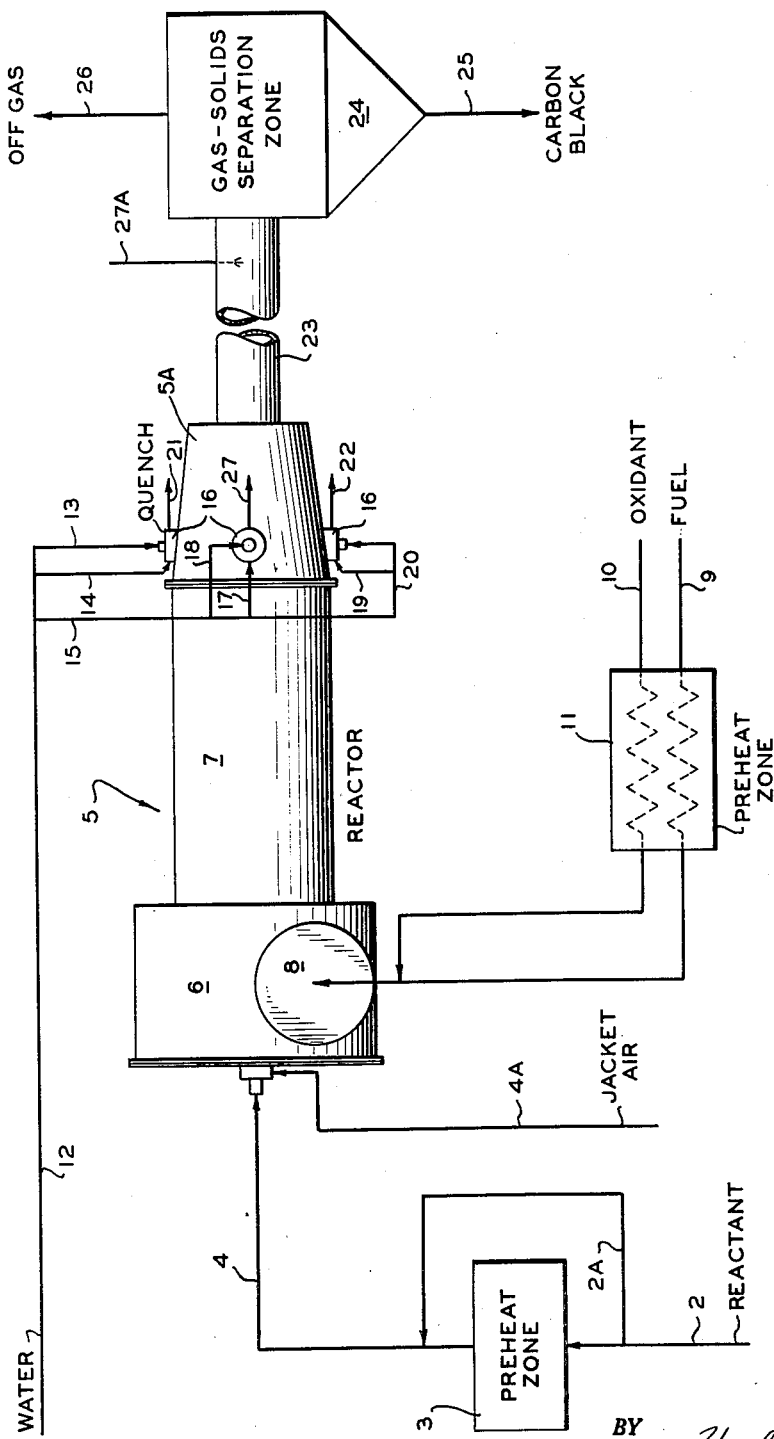
FIGURE 1 is a diagrammatic flow sheet of a process according to this invention.

As illustrated in FIGURE 1, a carbonaceous reactant enters preheat zone 3 through inlet 2 and is therein preheated and/or vaporized at any desired temperature. The reactant can be any carbonaceous material which is convertible to carbon black by pyrolysis and/or partial combustion. It is ordinarily a hydrocarbon material and can be normally gaseous, liquid, or solid. Suitable hydrocarbon materials are methane, ethane, propane, butane, naphtha, and gas oil. A very satisfactory material is a highly aromatic or cyclic gas oil, e.g., boiling within the range of about 400 to 700° F., such materials being produced as recycle stocks in cracking processes. The preheating can be omitted by the use of by-pass 2A, if desired, or only part of the reactant can be preheated.

The reactant passes through conduit 4 and is directed axially into reactor 5, which comprises a generally cylindrical combustion zone 6 and a generally cylindrical reaction zone 7. Combustion zone 6 has a greater diameter than reaction zone 7 and ordinarily has a length shorter than its diameter. Reaction zone 7 is generally of greater length than diameter. A small amount of air known as "jacket air" can be supplied through conduit 4A, preferably as an annular jacket surrounding the stream of reactant. Steam, or steam and air mixtures, can be substituted for said "jacket air" with success in the practice of this invention, but steam is not preferred because of its higher cost.

Simultaneously, a fuel and an oxidant enter the system through conduits 9 and 10, respectively. The fuel is preferably a fluid fuel, although a solid fuel can be used. The fuel may be gaseous or liquid, e.g., methane, ethane, propane, butane, hydrogen, carbon monoxide, or a fuel oil. The oxidant is ordinarily an oxygen-containing gas, such as oxygen, air or air enriched with oxygen. Either or both of the fuel and the oxidant can be heated, as desired, in preheat zone 11. The fuel and the oxidant are mixed in combustible proportions and passed to tangentially-positioned inlet 8 where they are ignited in tunnel 34 and directed circumferentially into reaction chamber 6 of the reactor 5. In some instances said combustion initiated in tunnel 34 is completed therein; in other instances it is completed in reaction chamber 6 with equivalent results.

The mixture can be either rich or lean, with respect to the fuel, or it can be a mixture of the fuel and the oxidant in stoichiometric proportions. The injection of the combustible mixture into reactor 5 and the subsequent combustion thereof near the periphery of combustion zone 6 produces a helically-moving mass of hot combustion gas traveling through reaction zone 7. The mass of hot gas transfers heat directly to the axially-directed reactant, which is converted to carbon black.

According to this invention, water, in the liquid phase, is directed through inlet 12 and through manifold lines 13, 15, 18, and 20, in a plurality of streams which are radially directed in a quench section 5A into reaction zone 7, thus suddenly lowering the temperature of the carbon black-containing reaction mixture traveling through reaction zone 7. Water can be directed through manifold lines 14, 17, and 19 as a coolant for quench inlets 16, as subsequently described. The cooled reaction mixture, which has preferably been cooled to a temperature below 2000° F., and more preferably to a temperature of from 1900 to 2000° F., is removed through pipe 23. In pipe 23, further cooling, e.g. to 1200° F. or lower, can be effected by exposure of pipe 23 (uninsulated) to the atmosphere, by the use of a further quench spray 27A and/or by the use of indirect heat exchange, the last-mentioned expedient not being shown in the drawing. The cooled reaction mixture passes to gas-solids separation zone 24. This zone can comprise any conventional equipment, such as cyclone separator bag filters, or electrical precipitators, or any desired combination of these means. Off-gas is with-drawn from the system through outlet 26, and carbon black is recovered through outlet 25.

FIGURES 2, 3 and 4 illustrate one embodiment of reactor 5 according to this invention. As shown in FIGURE 2, the reactor 5 comprises an outer metal shell 30 lined with insulation 31 and refractory 32; and inlet 33 is provided for axial introduction of reactant. The tangentially-positioned inlet 8, shown in FIGURE 3, is provided in combustion chamber or zone 6 and comprises tunnels 34 containing burners 35. Burners 35 are composed of air tubes 36 having orifices 39, and gas tubes 37 having closed ends 39A and a plurality of circumferentially spaced openings 38. In operation, air is supplied to tubes 36 and fuel gas to tubes 37. The fuel emerges through the openings 38 and mixes with the air while the mixture passes through orifices 39 into tunnels 34.

As stated, reaction zone or chamber 7 is of smaller diameter and greater length than combustion zone 6. Quench inlets 16 are radially positioned in reaction zone 7. As illustrated in FIGURES 2 and 4, quench inlets 16 are four in number and are radially positioned with respect to reaction zone 7. If desired, these inlets may be positioned at slight angle to the radius of zone 7. Also, a larger or smaller number than four can be used. It is desirable to use at least two such quench inlets. As shown in FIGURE 4, four such inlets are used and have been found to be quite satisfactory. These four inlets are spaced 90° apart around the circumference of reaction zone 7. Two such inlets 180° apart have been used to obtain good results.

FIGURES 5 and 6 illustrate an injector suitable for use according to this invention when the reactant, e.g. oil, is injected into the reactor in the vapor phase. The oil passes through inlet pipe 80 to which is attached, by means of threads, a cap member 81. Member 81 is chamfered as indicated at 82. A series of holes 83 are drilled perpendicular to the chamfered surface 82 and spaced circumferentially as illustrated. The angle "a" can be from 10 to 50°. In one apparatus, pipe 80 was 1½-inch pipe and member 81 was a 1½-inch pipe cap. Nozzles wherein angle "a" was 15° and 45° were utilized in the runs reported in Example 3 of this application. The angle 2a is designated the "included angle" of the spray nozzle. It will be noted that when a nozzle of this type is used, the injection of the oil is not strictly axial. However, aerodynamic studies of my process indicates that the direction of the oil, initially injected at an angle to the axis of the reactor is quickly changed to a direction substantially parallel to or coincident with said axis, so that the term "substantially axially," as used in the claims, includes injection as illustrated in FIGURES 5 and 6. Jacket air can be injected through annulus 80A in FIGURE 5.

FIGURES 7, 8, and 9 illustrate another type of injector suitable for use with a reactant which can be either liquid or vaporous. This injector which is disclosed in my copending application Serial No. 406,921, filed January 29, 1954, now U.S. Patent No. 2,781,247 of February 12, 1957, comprises a central oil tube 85, a cooling jacket 87, and an annular air conduit 95. Tube 85 is threaded at its inlet 86 and is provided with outlet tip 92 containing spray nozzle 93. Tip 92 is attached to tube 85 by means of threads, as shown. Air chamber 96 is provided with threaded inlet 97. Block 88 contains inlet 90, threaded at 98, and outlet 89, threaded at 99. Coolant induction tube 91 is attached to block 88 by means of threads, as shown. In operation, reactant liquid is introduced through tubes 85, and coolant liquid, usually water, is circulated through jacket 87, protecting tube 85 and tip 92 from oxidation. Jacket air enters through inlet 97 and passes through annulus 95, further protecting tube 85 and tip 92 from oxidation and from carbon deposition. Injector 84 is used in reactor 5 in place of inlet 33 or in place of the injector shown in FIGURE 5, block 88 and inlets 86 and 98 being positioned outside the reactor.

When the reactant is injected in the gaseous or vapor phase, tip 94, shown in FIGURE 9, can replace tip 92 in FIGURE 7.

Either injector 84 or nozzle 82 can be positioned to project into combustion chamber 6 or can be recessed in the end wall thereof.

Injector 84 is of welded construction, as indicated in FIGURE 7.

Figure 10:
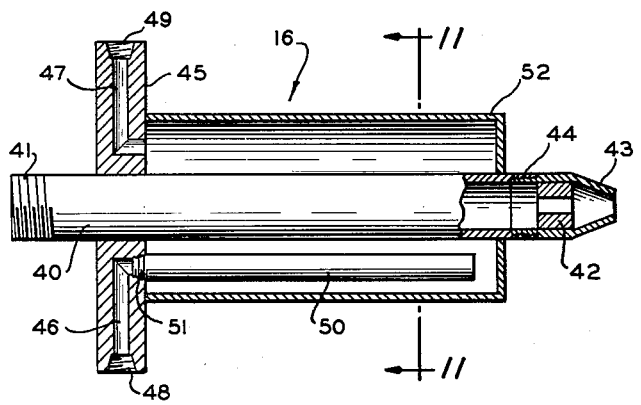
FIGURE 10 is an elevational view of a quench liquid inlet according to this invention.
Figure 11:
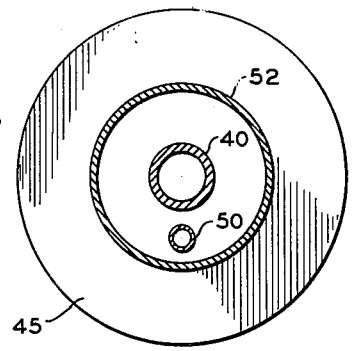
FIGURE 11 is a cross-sectional view of the inlet taken along line 11—11 of FIGURE 10.

FIGURES 10 and 11 illustrate one structure suitable for quench inlet 16 according to this invention. Quench inlet 16 comprises a central quench-liquid conduit 40, which is threaded at inlet end 41 and is provided with a spray nozzle 42 positioned in tip 43. Tip 43 is attached to conduit 40 by threads, as indicated, at 44. The quench inlet means 16 is also provided with a block member 45 which is drilled to provide coolant inlet 46 and coolant outlet 47 which can be suitably threaded, as indicated, at 48 and 49, respectively. Coolant induction tube 50 is attached to block 45, by means of threads, at 51. Surrounding central conduit 40 and induction tube 50, is a coolant jacket 52. The assembly of inlets can be accomplished by welding of the metal parts, as indicated, or by any other suitable type of construction.

In operation, the quench liquid, e.g., water, is passed through central tube or conduit 40 and spray nozzle 42 and directed into the interior of the reactor. A coolant liquid, which can be water, is directed into jacket 52 through inlet 46 and induction tube 50 and is withdrawn through outlet 47, thus protecting conduit 40 from oxidation during use.

FIGURES 12 and 12C illustrate reactor 5 provided with another type of quenching apparatus according to this invention. The numerals 5, 7, 30, 31, 32 represent members already described in connection with FIGURES 1 and 2. The numeral 60 represents an axially-positioned quench inlet through which quench water is injected into the interior of reaction zone 7 at a point at or near the axis thereof and is directed outwardly toward the periphery of the reaction zone, as indicated by the dash arrows. Quench inlet 60 extends through packing gland 62 in outlet pipe 61. Pipe 61 replaces quench section 5A of FIGURES 1 and 2. A packing material 63, which may be of asbestos or similar heat-resistant material, is provided to prevent leakage and is held in place by packing retainer 107. Quench inlet 60 is supported by a framework comprising supports 100, end member 101, and plate 102. Supports 100 and end member 101 are made of angle irons suitably welded to each other and to pipe 61, as shown. Plate 102 is secured to end member 101 by four bolts 103. Set screw 108 holds quencher 60 at any desired position laterally. Inlet 60 is longitudinally movable in packing gland 62 so that the position of the outlet 64 can be varied along the length of reaction chamber 7 as desired, by suitable adjustment of set screw 108.

FIGURE 12A shows details of end member 101. This member is generally rectangular and formed by welding, or otherwise joining together, four angle irons. Horizontally elongated slots 104 are provided as shown.

FIGURE 12B shows details of metal plate 102. Center opening 106 is provided to hold quencher 60. Four vertically elongated slots 105 are provided to register with slots 104 of end member 101.

Quencher 60 is ordinarily installed and adjusted by two persons, one of whom sights through the axial opening in the combustion chamber and directs the adjustment, which is done by the other person. The longitudinal position of outlet 64 is adjusted by means of set screw 108. Outlet 64 is then centered by vertically and horizontally adjusting the position of plate 102 with respect to end member 101 and tightening bolts and nuts 103. Packing retainer 107 is then tightened to complete the adjustment.

Figure 13:
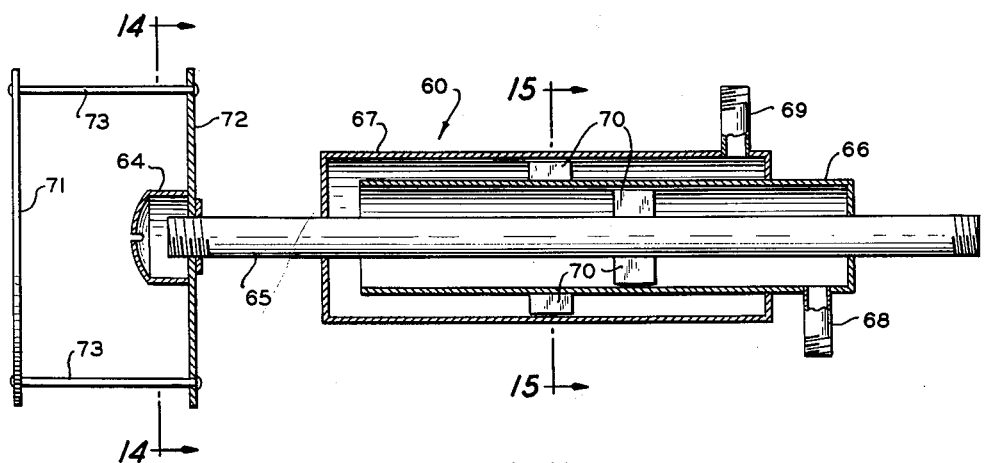
FIGURE 13 is a sectional elevation of a quench inlet 60 shown in FIGURE 12.
Figure 14:
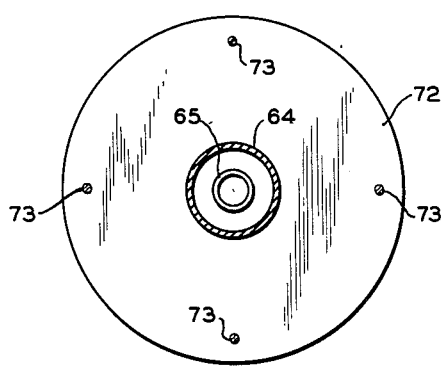
FIGURE 14 is a cross-sectional view taken along line 14—14 of FIGURE 13.
Figure 15:
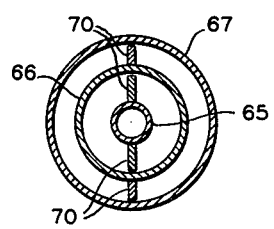
FIGURE 15 is a cross-sectional view taken along line 15—15 of FIGURE 13.

As shown in FIGURES 13, 14, and 15 quench inlet or injector 60 comprises a central tube 65, which is provided with a spray nozzle 64 at its outlet end. Surrounding tube 65 is induction tube 66, which is, in turn, surrounded by jacket 67. A threaded inlet 68 is provided in induction tube 66, and a threaded outlet 69 is provided in jacket 67. One or more spacers 70 can be provided within the jacket structure to prevent sagging of the various tubes when the injector is of considerable length. At the outlet end of tube 65, there is provided a deflector plate 71, which is attached to tube 65 by means of support plate 72 and rods 73, spray nozzle 64 being welded or otherwise suitably connected to support plate 72, and the entire structure comprising nozzle 64, plates 71 and 72, and rods 73 being attached to tube 64 by means of threads.

In operation, quench water enters through tube 65 and nozzle 64 and is directed against deflector plate 71 so that a plurality of water jets or streams are ultimately directed outwardly toward the periphery of reaction chamber 7, as indicated by the dotted arrows in FIGURE 12. A coolant liquid enters induction tube 66 through inlet 68 and passes through jacket 67, being withdrawn through outlet 69. A large portion of the inlet tube 65 is thus protected from the high temperatures in the reactor.

The embodiment of the invention illustrated in FIGURES 12 to 15 is useful not only for full-scale operation, but also for tests to determine the desired position of the quench outlet, e.g., when it is desired to locate the optimum position of inlets 16 in a reactor of the type illustrated in FIGURE 2. It is, however, within the scope of the invention to provide several sets or radial inlets of the types shown in FIGURES 2 and 4, the several sets being spaced longitudinally from each other so that the point of the injection of quench liquid can be varied in a reactor of the type shown in FIGURE 1.

FIGURE 13, for convenience, shows quench means 60 as being somewhat shorter than it ordinarily is, in comparison to its diameter.

EXAMPLE I

Two runs were conducted, utilizing a reactor of the type illustrated in FIGURES 1, 2, and 3. The reaction chamber 7 was 12 inches in diameter and 11 feet long. The combustion chamber 6 was 33 inches in diameter and 12 inches long. It was provided with two tangential inlets 34 spaced 180 degrees apart, each having a maximum diameter of 8 inches and a length of 20 inches. In each inlet was placed a burner made of 10-gauge steel. Each burner consisted of an air tube having an internal diameter of 5½ inches, a length of 8 9/16 inches, and a 4½-inch (I.D.) orifice at the tip thereof; and a 1-inch stainless steel gas tube, one end of which was closed and positioned flush with said orifice. The gas tube had a single circumferential row of eight ¼-inch openings in the side wall near the closed end thereof. The gas tube was positioned coaxially within the air tube. A tube was axially positioned in the end wall of the combustion chamber for introduction of the reactant. Two 7/64-inch orifice quench tubes were radially positioned to extend through the cylindrical wall of the reaction chamber at a position 6 feet from the outlet end of the reactor. The quench tubes were spaced 180 degrees apart around the circumference of the reaction chamber and each tube outlet was recessed slightly within the refractory lining.

Operation was begun by feeding a mixture of 12 parts by volume of air and 1 part by volume of gas (predominantly methane) to the tangential burners for a two-day preliminary furnace warm-up period, after which the volume ratio of air to gas was increased to 15:1 over a period of 4 days, oil was introduced, and carbon black was collected.

The oil introduced was an aromatic recycle gas oil produced in a cracking process and having a Bureau of Mines correlation index of 89.3 fed into the reactor through the axial inlet, the oil being vaporized prior to introduction into the reactor. A relatively small amount of air (jacket air) was introduced through an annular tube around the outside of the oil vapor inlet tube. The operating conditions were as follows:

| | |
|---|---|
| Oil feed rate, gal./hr | 202 |
| Tangential air rate, s.c.f.h | 185,000 |
| Tangential gas rate, s.c.f.h | 12,330 |
| Jacket air rate, s.c.f.h | 4,000 |
| Oil preheat temperature, °F | 725 |
| Total water to reactor quench inlets, gal./min | 5 |

The yield of carbon black was 2.69 pounds per gallon of oil feed. The carbon black had a photelometer value of 97% transmission, measured by extracting the black with chloroform, separating the carbon black, and measuring the light transmission of the resulting solution. A transmission of 85 percent or higher indicates that the black is by commercial definition tar-free.

The carbon black was pelleted in a dry pelleting process to a bulk density of 23.0 pounds per cubic foot and compounded into synthetic rubber samples which had the properties shown in Table I. "Control 1" and "Control 2" in the table are carbon blacks produced in generally the same manner as A and B except that no quench was used within the reactor. In all runs, quenching was effected downstream of the reactor, but in runs A and B, this was a secondary quench, whereas in the control runs, it was a primary quench.

Table I.—*Physical properties of carbon black compounded with 122° F. GR–S rubber* [1]

[Samples cured 30 minutes at 307° F.]

| Sample | Compression set, percent | 300% modulus, p.s.i.g. | Tensile, p.s.i.g. | Elongation, percent | Resilience, percent | Shore hardness | Abrasion loss | | Abrasion index | | Compounded Mooney MS-1½ |
|---|---|---|---|---|---|---|---|---|---|---|---|
| | | | | | | | Original, g. | Aged, g. | Original, percent | Aged,[2] percent | |
| A (this invention) | 19.8 | 1,170 | 3,260 | 585 | 59.9 | 54.0 | 8.78 | 7.32 | 122 | 125 | 35.0 |
| Control 1 | 18.0 | 1,180 | 3,060 | 565 | 61.7 | 53.0 | 10.67 | 9.19 | 100 | 100 | 33.5 |
| B (this invention) | 18.7 | 1,130 | 3,430 | 605 | 56.6 | 53.0 | 7.91 | 6.77 | 126 | 130 | 33.0 |
| Control 2 | 18.1 | 1,070 | 3,020 | 580 | 59.3 | 52.5 | 9.96 | 8.78 | 100 | 100 | 31.5 |

[1] Recipe:

| Component | Parts by weight |
|---|---|
| GR-S 1000 | 100 |
| Carbon black | 40 |
| Zinc oxide | 3 |
| Sulfur | 1.75 |
| BRT #7 [a] | 6 |
| Santocure [b] | 0.8 |

[a] BRT #7: A refined tar having high free C content. Used as softener.
[b] Santocure (trade name): N-cyclohexyl-2-benzothiazolesulfenamide. Accelerator.
[2] Oven aged 24 hours at 212 F.

The data show that Samples A and B (this invention) were superior to the controls, particularly in respect of abrasion resistance, which is a very important property of tire treads. The abrasion index in Table I is based on a comparative value of 100 assigned to the controls, which are, themselves, high-quality blacks. Thus, the superior abrasion index, indicating low abrasion loss, of the carbon blacks prepared according to this invention, is apparent.

EXAMPLE II

Several runs were conducted in a reactor of the type shown in FIGURE 12. The reactor was equipped with an axial quencher of the type shown in FIGURES 13, 14, and 15. The quencher was made of stainless steel. The central water tube was a 116-inch length of ½-inch pipe to which a 96-inch length of 2-inch-diameter water jacket was welded as shown in the drawing. A 1¼-inch water induction tube 98 inches long was welded inside the water jacket as shown in the drawings. Spacers of the type shown in the drawing were provided, in sets of three, at one-foot intervals along the interior of the water jacket. The quencher was longitudinally movable within the reactor.

In other respects, the reactor similar to that used in Example I except for the following: no radial quench was used; the combustion chamber was 22 inches in diameter and 6 inches long; the tangential tunnels had a maximum diameter of 6 inches and a length of 12½ inches; the tangential burners were 4 inches in internal diameter and 9 inches long with an orifice 2⅜ inches in internal diameter, the fuel and air being mixed before reaching the burners; and the reaction section was 6 inches in diameter and 5 feet long.

The operating conditions were essentially the same as in Example I except that the oil introduction rate and the oil correlation index were as shown in Table II. The tangential air introduction rate in all runs 1 to 4 was 60,000 s.c.f.h., the jacket axial air was 2,000 s.c.f.h. and the tangential natural gas rate was 4,000 s.c.f.h.

Table II

| Run | Bureau of Mines correlation index of oil | Distance from reaction chamber inlet to deflector plate of quencher, in. | Oil rate, g.p.h. | Yield, lb./gal. | Abrasion[1] index | Surface area, sq. m./g.[2] |
|---|---|---|---|---|---|---|
| 1 | 97 | 60 | 74.7 | 3.13 | 107 | 137.1 |
| 2 | 97 | 50 | 72.9 | 3.09 | 106 | 141.3 |
| 3 | 97 | 40 | 68.5 | 2.99 | 114 | 147.9 |
| 4 | 97 | 30 | 63.7 | 2.75 | 123 | 167.9 |

[1] Average of original and aged. Higher accelerator (0.9 phr) used with Run 4 (0.8 with all others).
[2] Determined by adsorption of $N_2$ at a low temperature.

The abrasion index was determined for rubber samples prepared from the recipe of Example 1 except for the changes indicated in Table II. The abrasion index in Table II is based on a value of 100 assigned to a standard carbon black of high abrasion resistance produced in a reactor of the type shown in the drawings, but of smaller dimensions and without an internal quencher. This standard carbon black has an unusually high abrasion resistance. As compared to the controls used in Example 1, it has an abrasion index of about 140. Thus, the superior abrasion resistance of the blacks produced according to this invention is evident. Also, the particle size decreased as the quencher was moved closer to the reactor inlet, as is indicated by the increase in surface area. The Mooney viscosity also increased with the surface area, thus indicating increasing rubber reinforcing properties.

It will be noted that the oil rate in Table II was progressively decreased as the quencher was moved closer to the reaction chamber inlet. This decrease was necessary in view of the decrease of effective reaction chamber length in order to obtain a tar-free carbon black product at a constant flow of tangential air and gas. The carbon black in the runs reported in Table II had a chloroform photelometer value of 88. Decreasing the oil rate resulted in a corresponding decrease in yield.

of Mines correlation index of 89. The results are shown in Table III.

*Table III*

REACTOR CONTROL

| Run No. | Feed-stock No. | Oil rate, gal./hr. | Tangential Air rate, c.f.h. | Tangential Gas rate, c.f.h. | Jacket air rate, c.f.h. | Effective precombustion chamber length, in. | Photelometer | Off-gas analysis CO₂ | C₂H₂ | H₂ | CO | CH₄ | N₂ | Est. pilot plant yield, lb./gal. | Grit[1] 325 mesh, percent | Nigrometer |
|---|---|---|---|---|---|---|---|---|---|---|---|---|---|---|---|---|
| 1 | B-170 | 227.9 | 185,000 | 12,330 | 4,000 | 12 | 88 | 5.96 | 0.69 | 10.34 | 10.97 | 0.40 | 71.64 | 3.46 | .003 | 88.2 |
| 2 | B-170 | 223.8 | 185,000 | 12,330 | 4,000 | 12 | 88 | 5.96 | 0.75 | 10.10 | 10.90 | 0.40 | 71.89 | 3.40 | .04 | 88.4 |
| MULTIPLE PORT OIL INLET NOZZLE, 90 DEGREE INCLUDED ANGLE | | | | | | | | | | | | | | | | |
| 3 | B-170 | 231.2 | 185,000 | 12,330 | 4,000 | [2]10½ | 90 | 5.86 | 0.85 | 10.56 | 11.10 | 0.35 | 71.27 | 3.38 | .03 | 87.9 |
| 4 | B-170 | 229.0 | 185,000 | 12,330 | 4,000 | [2]9 | 89 | 5.91 | 0.91 | 10.41 | 11.22 | 0.45 | 71.10 | 3.23 | .05 | 86.0 |
| 5 | B-170 | 224.6 | 185,000 | 12,330 | 4,000 | [2]7½ | 90 | 5.81 | 0.88 | 10.38 | 11.46 | 0.50 | 70.97 | 3.10 | .005 | 85.7 |
| MULTIPLE PORT OIL INLET NOZZLE, 30 DEGREE INCLUDED ANGLE | | | | | | | | | | | | | | | | |
| 6 | B-170 | 230 | 185,000 | 12,330 | 4,000 | [2]10½ | 90 | 5.83 | 0.84 | 10.61 | 11.03 | 0.44 | 71.25 | 3.43 | .05 | 87.6 |
| 7 | B-170 | 226.3 | 185,000 | 12,330 | 4,000 | [2]9 | 91 | 5.91 | 0.79 | 10.60 | 11.18 | 0.44 | 71.08 | 3.27 | .07 | 85.6 |
| 8 | B-170 | 225.8 | 185,000 | 12,330 | 4,000 | [2]7½ | 90 | 5.89 | 0.91 | 10.55 | 11.35 | 0.32 | 70.98 | 3.18 | .03 | 84.9 |

[1] Total grit from bag filter sample.
[2] Distance from end of oil nozzle to inlet of reaction chamber. Nozzle projected into combustion chamber.

EXAMPLE III

A reactor of the type shown in FIGURE 2, but provided in runs 3 to 8 with oil injection apparatus of the type indicated in FIGURE 5, was used in a series of runs in which the reactant oil was injected into the reactor after vaporization at 700° F. The oil nozzle projected into the combustion chamber. Jacket air was introduced through the annular conduit surrounding the nozzle. The reactant oil used in these runs was a gas oil obtained by blending an aromatic gas oil with an aromatic oil which was obtained by extracting a gas oil with liquid sulfur dioxide and recovering the extract. The blended oil had a Bureau The two control runs (1 and 2) in Table III were conducted according to the procedure of Example I, the reactant being vaporized prior to entry into the reactor. Two radial quench inlets, positioned 180 degrees apart and 6 feet upstream from the reactor outlet, were used in all of the eight runs. The reaction conditions and reactor dimensions were the same as in Example I except as otherwise shown in Table III. No carbon deposits were obtained in the reactor in any of the runs.

The carbon blacks obtained were compounded into rubber samples which were tested. The results are given in Table IV. The samples designated X and Y were prepared from high-quality commercial carbon blacks.

*Table IV.—Properties of rubber samples*

REACTOR CONTROL

| Run | Carbon black surface area, m.²/g. | Compression set, percent | 80° F. 300% modulus p.s.i. | 80° F. Tensile p.s.i. | 80° F. Elongation percent | 200° F. maximum tensile p.s.i. | ΔT° F. | Resilience, percent | Flex life M | Shore hardness | Abrasion loss,[2] g. | Compounded MS 1½ | Extrusion at 250° F. In./min. | G./min. | Rating |
|---|---|---|---|---|---|---|---|---|---|---|---|---|---|---|---|
| 1 | | 19.8 | 1,220 | 3,540 | 590 | 1,680 | 65.5 | 58.6 | 5.8 | 56 | 7.85 | 34 | 29 | 75 | 10+ |
| 2 | 101.9 | 19.0 | 1,270 | 3,580 | 565 | 1,670 | 65.9 | 57.5 | 5.0 | 56.5 | 7.11 | 34 | 28.9 | 74.5 | 11− |
| MULTIPLE PORT OIL INLET NOZZLE, 90 DEGREE INCLUDED ANGLE | | | | | | | | | | | | | | | |
| 3 | [1]98.0 | 18.5 | 1,210 | 3,460 | 590 | 1,400 | 65.2 | 57.0 | 4.8 | 56 | 7.33 | 35 | 26.7 | 68 | 10+ |
| 4 | 111.4 | 18.0 | 1,210 | 3,430 | 560 | 1,580 | 67.6 | 56.1 | 4.0 | 57.5 | 6.72 | 36.5 | 26.4 | 68 | 10 |
| 5 | 116.6 | 19.1 | 1,220 | 3,650 | 595 | 1,590 | 68.6 | 55.0 | 5.8 | 58 | 6.82 | 37.5 | 26 | 65 | 10− |
| MULTIPLE PORT OIL INLET NOZZLE, 30 DEGREE INCLUDED ANGLE | | | | | | | | | | | | | | | |
| 6 | 107.0 | 18.0 | 1,330 | 3,650 | 580 | 1,540 | 68.3 | 55.9 | 4.0 | 58 | 6.52 | 36 | 27 | 68.5 | 10+ |
| 7 | 112.8 | 17.4 | 1,280 | 3,430 | 555 | 1,490 | 67.9 | 55.8 | 4.8 | 58.5 | 6.53 | 36.5 | 25.4 | 63.5 | 9+ |
| 8 | 114.6 | 17.9 | 1,210 | 3,520 | 580 | 1,520 | 68.3 | 55.8 | 4.6 | 58.5 | 6.68 | 36.5 | 27 | 69 | 10− |
| X | | 20.4 | 1,110 | 3,630 | 620 | 1,530 | 70.6 | 56.0 | 5.2 | 57 | 6.93 | 38 | 25.8 | 64.2 | 10− |
| Y | | 21.2 | 1,100 | 3,100 | 585 | 1,520 | 68.3 | 57.1 | 8.3 | 55 | 9.61 | 33.5 | 27.5 | 71.5 | 11− |

Table IV.—Properties of rubber samples—Continued

Physical properties of rubber samples

OVEN AGED 24 HOURS AT 212° F. REACTOR CONTROL

| Run | Carbon black surface area m.²/g. | 80° F. | | | ΔT° F. | Resilience, percent | Flex life M | Shore hardness | Abrasion loss [2] |
|---|---|---|---|---|---|---|---|---|---|
| | | 300% modulus, p.s.i. | Tensile, p.s.i. | Elongation, percent | | | | | |
| 1 | | 2,130 | 3,290 | 415 | 54.4 | 65.5 | 3.5 | 63 | 5.71 |
| 2 | 101.9 | 2,150 | 3,750 | 450 | 56.8 | 65.0 | 4.6 | 63 | 4.96 |

MULTIPLE PORT OIL INLET NOZZLE, 90 DEGREE INCLUDED ANGLE

| 3 | [1] 98.0 | 2,050 | 3,330 | 420 | 57.1 | 64.3 | 3.9 | 63 | 5.39 |
| 4 | 111.4 | 2,160 | 3,260 | 400 | 60.2 | 62.8 | 2.8 | 63.5 | 4.64 |
| 5 | 116.6 | 2,100 | 3,730 | 450 | 58.5 | 61.6 | 2.9 | 64.5 | 4.73 |

MULTIPLE PORT OIL INLET NOZZLE, 30 DEGREE INCLUDED ANGLE

| 6 | 107.0 | 2,160 | 3,690 | 440 | 58.1 | 63.0 | 4.1 | 63.5 | 4.77 |
| 7 | 112.8 | 2,200 | 3,470 | 420 | 57.8 | 62.9 | 3.8 | 64 | 4.62 |
| 8 | 114.6 | 2,050 | 3,750 | 450 | 57.8 | 62.6 | 2.7 | 64.5 | 4.60 |
| X | | 1,950 | 3,600 | 470 | 58.8 | 62.5 | 3.3 | 63 | 5.05 |
| Y | | 1,780 | 3,220 | 455 | 58.1 | 66.9 | 3.8 | 61 | 6.96 |

[1] Recheck gave a value of 96.9.
[2] 35 minutes cure time.

RECIPE

| | |
|---|---|
| GR-S X-720 | 100 |
| Black | 40 |
| ZnO | 3 |
| BRT #7 | 6 |
| Sulfur | 1.75 |
| Santocure | 0.8 |

The data above show that the use of the spray nozzles of the type shown in FIGURE 5, in combination with an internal quench according to this invention, further improves the abrasion resistance of the product carbon black, as indicated by the lowered abrasion loss in Table IV.

EXAMPLE IV

Since filing the parent application Serial No. 406,695 of January 28, 1954, it was unexpectedly discovered that SAF-type carbon black characterized by a nitrogen surface area above 130 square meters per gram, and characterized by abrasion resistance of rubber mixtures containing the same, could be produced by increasing the tangential air rate from 185,000 c.f.h. and gas rate from 12,330 c.f.h. of Table III to above 270,000 and above 18,000 c.f.h. respectively, for example 290,000 and 19,330 c.f.h. respectively, and extending the oil nozzle 4 into the combustion zone 6 from 2 to 6 inches, for example 3 inches, so that it was from 10 to 6 inches in advance of the reaction zone. In the practice of this phase of the present invention the air rate can be from 270,000 to 360,000 c.f.h. and higher, and the gas rate can be in proportion equivalent in heating value to that given by from 18,000 to 24,000 c.f.h. of methane, and can be varied to make the mixture thereof rich or lean, or stoichiometric with respect to the fuel as mentioned above, and while methane, or natural gas is preferred as the fuel, useful results in the invention can be obtained when the fuel is ethane, hydrogen, carbon monoxide, kerosene, fuel oil, other hydrocarbons or powdered coal and other free oxygen-containing gases are substituted for the air as mentioned above.

The furnace in Table V was as shown in FIGURE 2 of the drawing with the exception that in run No. 9 the "normal position" of tube 33 as noted in the table was with tube 33 recessed or withdrawn inside of ceramic tube 80A (numbered in FIGURE 5) about ½ to 2 inches. In the other runs the end of the tube was flush with the end thereof, or projected into combustion chamber 6 by 3, 4.5 or 6 inches as noted in the respective run. The dimensions of chamber 6 were 12 inches long by 33 inches in diameter, and chamber 7 was 12 inches in diameter and 60 inches long from chamber 6 to quench 16.

The same fuel gas was used. Due to difficulties of oil storage and supply, and the fact that each run consumes considerable oil, and time, the oil used was varied slightly, as shown in Table VI, but the variation in BMCI was not at all enough to account for the magnitude of differences in abrasion resistance noted in Table VII.

It will be noted that 0.8 part "Santocure" was used in some of the rubber tests and 0.9 part in others, but this was because the black produced by the high air rate runs of the present invention was so different that these different amounts of curing agent were necessary in order to get the same degree of cure as shown by the compression set figures in Table VII so that the abrasion figures would be strictly comparable.

Carbon black from each of the runs was separately compounded in a standard rubber mix of 100 parts by weight of the same GRS rubber (GR-S-X-720), 40 parts of the carbon black from the run being tested, 3 parts zinc oxide, 1.75 parts sulfur, 6 parts BRT #7, and 0.8 part Santocure except where 0.9 part Santocure was used.

BRT #7 is a refined coal tar product, 1.2 to 1.25 specific gravity, of Engler specific viscosity at 100° C. of 6 to 9, used as plasticizer.

Santocure is N-cyclohexyl-2-benzothiazylsulfenamide.

As the tests in the tables are all standard rubber tests made in the standard and conventional way, it is not believed necessary to go into details about them. These tests were made by men skilled in such standard rubber testing.

The diameter of the tangential tunnels 34 is noted as 10" or 12" in Table V, but seemed to make little difference, the larger tunnels being slightly superior due to more complete combustion of the fuel gas in the larger space available. Table V gives the feed rates and other run details, Table VI the analysis of the axial oil feedstock numbers of these runs as noted in Table V, and Table VII gives the properties of standard rubber samples in which the carbon black of the respective runs is incorporated. Run 19 in Table V was made with a very small ⅜" oil tube to show operability with high oil velocity, which it demonstrated, although the quality of the carbon black was not quite as good as in other runs.

Table V.—Run conditions

CONTROL RUN, INLET 33 OF FIGURE 2

| Run No. | Oil feedstock (Table VI) | Oil rate, gal./hr. | Oil inlet position inside chamber, in. | Oil preheat, °F. | Tangential Air rate, Mcfh. | Tangential Gas rate, Mcfh. | Jacket air rate, Mcfh. | Photelometer | Carbon black yield, lb./gal. | Grit 325 mesh percent | Nigrometer | Nitrogen surface area sq. m./g. | Diameter of tangential tunnels 34, in. |
|---|---|---|---|---|---|---|---|---|---|---|---|---|---|
| 9 | B-192 | 215.2 | Normal | 725 | 185 | 12.33 | 4 | 90 | 3.27 | .006 | 86.4 | 107 | 10 |

NOZZLE 81 OF FIGURE 5 WITH 30 HOLES

| Run No. | Oil feedstock | Oil rate | Oil inlet pos. | Oil preheat | Air rate | Gas rate | Jacket air | Photel. | Yield | Grit | Nigrom. | N₂ area | Diam. |
|---|---|---|---|---|---|---|---|---|---|---|---|---|---|
| 10 | B-192 | 279.1 | 0 | 715 | 290 | 19.33 | 4 | 90 | 3.16 | .016 | 86 | 112.4 | 10 |
| 11 | B-192 | 277.9 | 4½ | 725 | 290 | 19.33 | 4 | 90 | 2.69 | .024 | 80.3 | 141.9 | 10 |
| 12 | B-192 | 271 | 6 | 735 | 290 | 19.33 | 4 | 90 | 2.31 | .08 | 79.7 | 146.8 | 10 |

NOZZLE 81 OF FIGURE 5 WITH 15 HOLES

| 13 | B-192 | 301.8 | 0 | 735 | 290 | 19.33 | 4 | 90 | 3.33 | .04 | 86 | 111.3 | 10 |
| 14 | B-192 | 291.3 | 4½ | 760 | 290 | 19.33 | 4 | 88 | 2.58 | .38 | 81 | 138.2 | 10 |

INLET 33 OF FIGURE 2

| 15 | B-192 | 287.9 | Normal | 735 | 290 | 19.33 | 4 | 89 | 3.17 | .004 | 84.1 | 123.1 | 10 |

INLET 92 OF FIGURE 7

| 16 | B-193 | 286 | 3 | 725 | 290 | 19.33 | 4 | 88 | 2.74 | .05 | 81 | 133.2 | 10 |
| 17 | B-193 | 276 | 4½ | 730 | 290 | 19.33 | 4 | 88 | 2.56 | .06 | 79.2 | 142.7 | 10 |
| 18 | B-194 | 271 | 6 | 725 | 290 | 19.33 | 4 | 88 | 2.49 | .04 | 79.3 | 145.8 | 10 |

INLET 33 OF FIGURE 2

| 19 | B-198 | 277.8 | 3 | 730 | 290 | 19.33 | 4 | 88 | 2.69 | .02 | 81.0 | 134.6 | 10 |
| 20 | B-198 | 281.8 | 3 | 730 | 290 | 19.33 | 1 3 | 90 | 2.59 | .01 | 79.9 | 139.4 | 10 |
| 21 | B-207 | 271.8 | 3 | 460 | 290 | 19.33 | 4 | 90 | 2.60 | — | — | 142.8 | 12 |
| 22 | B-207 | 273 | 3 | 775 | 290 | 19.33 | 4 | 90 | 2.57 | .02 | — | 145.0 | 10 |

CONTROL RUNS FOR AIR RATE, INLET 33 OF FIGURE 2

| 23 | B-207 | 241 | 3 | 750 | 185 | 12.33 | 4 | 90 | 3.27 | — | — | 109.9 | 12 |
| 24 | B-207 | 226.7 | 3 | 770 | 185 | 12.33 | 4 | 90 | 3.64 | .01 | — | 103.3 | 10 |

¹ Steam used in place of air in jacket fluid injection.

NOTE.—Where a dash occurs instead of data, data was not run.

Table VI.—Properties of feedstock oils of Table V

| Feedstock No. | B-192 | B-193 | B-194 | B-198 | B-207 |
|---|---|---|---|---|---|
| Feedstock description | (¹) | (¹) | (¹) | (¹) | (²) |
| Date received | 5-10-54, 5-19-54 | 6-11-54 | 6-16-54 | ³8-4-54 | |
| Aniline Point, F | | 68.9 | 64.8 | 63.5 | 72.30 |
| Gravity, API | 11.9 | 11.3 | 11.4 | 12.0 | 12.3 |
| Distillation, ASTM (F. at 760 mm.): | | | | | |
| First Drop | 331 | 398 | 319 | 366 | 449 |
| 5 | 526 | 532 | 503 | 403 | 497 |
| 10 | 554 | 556 | 538 | 527 | 521 |
| 20 | 576 | 581 | 575 | 562 | 574 |
| 30 | 589 | 600 | 600 | 575 | 600 |
| 40 | 607 | 619 | 614 | 592 | 609 |
| 50 | 623 | 635 | 634 | 612 | 634 |
| 60 | 637 | 650 | 652 | 630 | 652 |
| 70 | 662 | 668 | 674 | 658 | 672 |
| 80 | 688 | 695 | 704 | 687 | 705 |
| 90 | 722 | 730 | 766 | 741 | 761 |
| 95 | Cracked | 772 | ⁴771 | 771 | ⁴772 |
| EP | | | | | |
| Rec | | | | | |
| Res | | | | | |
| Bureau of Mines correlation index | 91.4 | 92.8 | 92.2 | 92.0 | 89.4 |
| Carbon residue, Ramsbottom, weight percent | 1.79 | 3.25 | 3.66 | 1.40 | 4.31 |
| SUS, 100 F | | 60.46 | 60.29 | 54.20 | 60.67 |
| SUS, 210 F | | 33.87 | 33.90 | 33.21 | 33.94 |
| RI 20/D | 1.5814 | 1.5825 | 1.6050 | 1.6002 | 1.5781 |
| Pour point F | | 25 | 30 | 15 | 25 |
| Carbon weight percent | | | | 89.1 | 89.1 |
| Hydrogen, weight percent | | | | 9.1 | 10 |
| Sulfur, weight percent | | | | 1.4 | 1.03 |

¹ SO₂ extract tank 87.
² SO₂ extract.
³ Sampled.
⁴ At 92%.

Variation and modification are possible within the scope of the disclosure and claims to this invention. While certain process steps, structures and examples have been described for purposes of illustration, the invention clearly is not limited thereto. The essence of the invention is a carbon black process and an apparatus wherein the reaction mixture containing carbon black is quenched within the reaction zone proper. The essence of the invention as to the production of high surface area carbon black and high resistance to abrasion of rubber compounds containing the same, as clearly shown by the numerical data in the examples in Table V, a 12-inch diameter reaction zone furnace, is further to increase the tangential air rate to above 270,000 standard cubic feet per hour, the tangential gas rate to above the equivalent of 18,000 standard cubic feet per hour of methane, and the axial oil rate to at least 270 gallons per hour, and to extend the axial hydrocarbon feed injection point from 2 to 6 inches into the inlet end of the combustion zone of the furnace. For other diameter reaction zone fur- Table VII.—*Physical properties of standard rubber samples containing the carbon blacks of the respective runs of Table V*

| Run No. | Compression set, percent | 300% modulus, p s.i. | Tensile, p.s.i. | Elongation, percent | Δ T° F. | Resilience, percent | Flex life, M | Abrasion loss |
|---|---|---|---|---|---|---|---|---|
| 9 | 19.4 | 1,170 | 3,410 | 600 | 69.9 | 57.1 | 8.3 | 8.31 |
| 10 | 19.1 | 1,200 | 3,260 | 570 | 69.3 | 56.4 | 6.6 | 8.49 |
| 11 | 20.4 | 1,020 | 3,330 | 615 | 72.6 | 53.4 | 5.9 | 8.09 |
| 12 | 19.9 | 850 | 3,600 | 675 | 75.3 | 52.3 | 6.6 | 8.53 |
| 13 | 19.5 | 1,080 | 3,170 | 595 | 69.3 | 56.3 | 8.4 | 8.62 |
| 14 | 20.0 | 970 | 3,390 | 635 | 73.0 | 52.7 | 4.6 | 8.17 |
| 15 | 19.3 | 1,090 | 3,280 | 590 | 70.6 | 54.9 | 5.9 | 8.63 |
| 16 | 19.4 | 960 | 3,400 | 640 | 70.3 | 52.9 | 8.0 | 8.18 |
| 17 | 19.3 | 1,040 | 3,260 | 595 | 72.3 | 52.0 | 7.8 | 8.06 |
| 18 | 20.0 | 1,000 | 3,320 | 625 | 74.3 | 52.2 | 8.4 | 8.20 |
| 19 | 18.2 | 1,080 | 3,380 | 590 | | | | 8.02 |
| 20 | 17.4 | 1,080 | 3,720 | 630 | | | | 7.09 |
| 21 | 20.4 | 1,010 | 3,520 | 630 | 67.6 | 54.3 | 6.8 | 7.94 |
| 22 | 21.2 | 980 | 3,510 | 615 | 68.3 | 54.0 | 4.2 | 8.08 |
| 23 | 22.0 | 1,030 | 3,390 | 605 | 68.3 | 56.7 | 3.0 | 8.19 |
| 24 | 22.6 | 1,030 | 3,360 | 610 | 67.9 | 56.5 | 3.6 | 8.71 | naces, these rates vary directly at about the 2.3 power of the diameter of the reaction zone, as follows:

Table VIII

| Diameter of reaction zone in Inches | Minimum feed rates to produce high surface area, high abrasion resistance, carbon black | | |
|---|---|---|---|
| | Tangential | | Axial, oil, gals./hr. |
| | Air, scf./hr. | Gas, scf./hr. | |
| 4 | 21,600 | 1,435 | 22 |
| 6 | 55,000 | 3,660 | 55 |
| 12 | 270,000 | 18,000 | 270 |
| 15 | 460,000 | 30,700 | 460 |
| 18 | 700,000 | 46,000 | 700 |

While the invention has been described in connection with a process and apparatus of the tangential flame type, it is also useful with other processes and apparatus for carbon black production.

Tests in a 4-inch internal diameter by 61.5-inch long reactor chamber furnace using a conventional SO₂ extract gas oil at an oil rate of 27.3 gallons per hour, a preheat temperature of 745, tangential rates of 23,440 and 1560 cubic feet per hour of air and gas, respectively, with a jacket air rate of 400 cubic feet per hour, a reactor temperature of 2555° F., yielded about 3.05 lbs. of 93 chloroform photolometer carbon black per gallon of oil having an excellent tint of 214, and only 0.024% of 325 mesh grit. Compounded in rubber this carbon black reinforced it so that this rubber had a low abrasion loss of only 7.73 grams.

Comparative tests in a 4-inch internal diameter by 37.5-inch long reactor chamber furnace using B-107 oil in each run gave the following changes in yield and abrasion loss in rubber, with changes in feed rates, to support the criticality of Table VIII, and are reported in Table IX:

Table IX

| Feed rates tangential | | Axial oil, gals./hr. | Abrasion loss (g.) | Carbon black yield (lbs./gal. oil) |
|---|---|---|---|---|
| Air, scf./hr. | Gas, scf./hr. | | | |
| 14,660 | 980 | 18.5 | 4.25 | 2.73 |
| 20,500 | 1,366 | 26.6 | 4.14 | 2.76 |
| 23,440 | 1,560 | 28.9 | 4.03 | 2.78 |

I claim:
1. A process for the production of carbon black of high surface area which imparts high resistance to abrasion to rubber compounds containing the same, comprising the steps of introducing a reactant hydrocarbon into a generally cylindrical heat insulated combustion zone of greater diameter than length, causing a mass of hot gas to helically envelop said reactant hydrocarbon in said combustion zone, passing said reactant and enveloping gas downstream into a generally cylindrical heat insulated reaction zone of smaller diameter than said combustion zone and of greater length than diameter, and introducing liquid coolant as a spray directly into said reaction zone at a locus immediately downstream from the locus where the resulting carbon black becomes tar-free, said mass of hot gas for a reaction zone of 12-inch diameter being formed by the tangential introduction into said combustion zone of at least 270,000 standard cubic feet of air per hour and a volume of fuel gas equivalent in heating value to at least 18,000 standard cubic feet of methane per hour, said reactant hydrocarbon being introduced axially downstream into said combustion zone at a rate when measured as a liquid of at least 270 gallons per hour at a point from 2 to 6 inches downstream from the upstream end of said combustion zone, the above rates of air, gas and hydrocarbon introduction for other diameter reaction zones varying directly as the 2.3 power of the ratio of the diameters of the respective reaction zones.

2. The process of claim 1 in which the liquid coolant comprises water and is introduced as a spray in sufficient volume to suddenly lower the temperature of the resulting mixture below 2,000° F.

References Cited in the file of this patent

UNITED STATES PATENTS

| 2,375,795 | Krejci | May 15, 1945 |
| 2,492,481 | Kaufmann et al. | Dec. 27, 1949 |
| 2,632,713 | Krejci | Mar. 24, 1953 |
| 2,659,662 | Heller | Nov. 17, 1953 |
| 2,731,466 | Heffner | Jan. 17, 1956 |
| 2,781,251 | Howell | Feb. 12, 1957 |
| 2,785,054 | Bethea et al. | Mar. 12, 1957 |

FOREIGN PATENTS

| 386,397 | Great Britain | Jan. 19, 1933 |
| 586,674 | Germany | Oct. 25, 1933 |